United States Patent [19]

Cheng

[11] Patent Number: 5,417,746

[45] Date of Patent: May 23, 1995

[54] WASHABLE CRAYON COMPOSITION

[76] Inventor: Chen-Pei Cheng, 59-6 Pei-Hsi Li, Hu-Wei, Taiwan, Prov. of China

[21] Appl. No.: 177,946

[22] Filed: Jan. 6, 1994

[51] Int. Cl.$^6$ .................. C09D 13/00; C09D 11/12
[52] U.S. Cl. .................. 106/19 B; 106/27 H; 106/31 R
[58] Field of Search .................. 106/19 B, 27 A, 31 R

[56] References Cited

U.S. PATENT DOCUMENTS

| | | | |
|---|---|---|---|
| 3,993,492 | 11/1976 | Woolly | 106/19 A |
| 4,212,676 | 7/1980 | Ueda | 106/19 B |
| 4,212,786 | 7/1980 | Murakami | 106/19 B |
| 4,978,390 | 12/1990 | Snedeker | 106/19 B |
| 5,084,098 | 1/1992 | Olson | 106/19 B |

FOREIGN PATENT DOCUMENTS 058621  5/1977  Japan .

Primary Examiner—Helene Klemanski

Attorney, Agent, or Firm—Bacon & Thomas

[57] ABSTRACT

A washable crayon composition, which is characterized in having:

(a) pigment which is solid at ambient temperature;

(b) polyoxyethylene nonyl phenyl ether in the form of paste at ambient temperature;

(c) sorbitan monostearate in the form of paste at ambient temperature;

(d) stearic acid which is solid at ambient temperature;

(e) polyethylene glycol which is solid at ambient temperature;

(f) wax which is solid at ambient temperature; and (g) 1) kaolin which is solid at ambient temperature;

2) calcium carbonate which is solid at ambient temperature; or 3) talc powder at ambient temperature.

17 Claims, No Drawings

WASHABLE CRAYON COMPOSITION

BACKGROUND OF THE INVENTION

1. Field of the Invention

The present invention relates to a crayon composition, and especially to one which is washable. The composition is adapted to be made as crayons or pencil leads etc., and is easily washed with water when it has been painted on a cloth or a wall or a smooth surface such as glass surface. The composition is comprised mainly of pigment, polyoxyethylene nonyl phenyl ether, sorbitan monostearate, stearic acid, polyethylene glycol, wax and kaolin, wherein polyoxyethylene nonyl phenyl ether and sorbitan monostearate may be used as stabilizer and surfactant respectively.

2. Description of the Prior Art

The washable crayon compositions available in the market presently are crayon products which are advertised as being easily scrubbed with water after they are painted on a cloth or a wall; however, users are not satisfied with them in practice. For example, a washable solid marking composition as stated in the U.S. Pat. No. 4978390 including polyethylene glycol resin, water soluble surfactant, pigment; at least a compatible viscosity modifier, a compatible plasticizer, an antifoam agent and an inert filler. The molecular weights of the polyethylene glycols used in this composition are all above 10,000. As is known in the art, the higher the molecular weight, the worse the solubility and fluidity thereof, and also the higher the heating temperature for solution thereof and the less uniform the coloration. This can not only induce sensitization of the skin or respiratory tract of a consumer, but it can also create environmental pollution while in the production process.

SUMMARY OF THE INVENTION

The present invention overcomes the defects in the washable marking compositions known in the art. It has been discovered, after long term study and experiment, that if the molecular weight of polyethylene glycol can be lowered to 4,000, the workability thereof will be excellent; and with stearic acid, kaolin, wax, pigment as well as with polyoxyethylene nonyl phenyl ether as a stabilizer and botanical stearic acid sorbitan monostearate as a surfactant, the product will be most easily washed. In the process of the experiment, the inventor tried to use wax as the basic material of the compositions which includes was (56.6% by weight), polyvinyl wax 8%, polyoxyethylene nonyl phenyl ether 16%, clay 16%, and pigment 3.4%. The resulting product does not comply with the requirement of being totally "washable", i.e., it could not be scrubbed completely off with water when it had been applied on a cloth or a wall. When stearic acid was used instead of wax for a basic material, the "washability" was improved very much, but one week later, the product thereof mildewed. This undesirable effect might be induced because of poor compatibility of the stearic acid and other materials. Therefore, according to the experience of about 20 years of the inventor in producing crayons, polyethelene glycol having molecular weight of 4,000 can be added to the composition to achieve the effect of stabilizing stearic acid. The conclusion derived from the study and invention of the inventor is that the use of stearic acid will help to reduce industrial contamination, to lower the unit price, to substitute itself for wax as a principal material, and to reduce the consumption of polyethylene glycol. The waste water discharged from a factory in a processing procedure will not contaminate its environment, and the products used up and discarded by consumers can be completely resolved in water and no contamination will be induced.

In view of this, the principal object of the present invention is to provide a washable crayon composition for use in a crayon product made of the above materials. The crayon compositon can be easily washed off when it is painted on a cloth or a wall or a smooth surface such as glass surface. It can be scrubed easily with water, leaving no tracks.

Another object of the invention is to substitute botanical stearic acid for wax as a principal material, and to add minor polyethylene glycol in order to stabilize stearic acid. This can not only get rid of the conventional defects of mildewing and emitting bad odor, but will also result in a non-toxic product. Thus, consumers and especially the children using it will not be poisoned if they accidentally draw it on their faces or mouths, and the products used up and discarded by consumers can be completely resolved in water and no contamination will be induced. Further, due to the non toxic nature thereof, any waste sewage from the manufacturing process to be discharged in a ditch or penetrated into soil will not contaminate the environment, and therefore the invention complies with the requirements of the standards of environmental protection.

DETAILED DESCRIPTION OF THE PREFERRED EMBODIMENT

The washable crayon composition of the present invention comprises:

(a) pigment which is solid at ambient temperature;

(b) polyoxyethylene nonyl phenyl ether in the form of paste at ambient temperature;

(c) sorbitan monostearate in the form of paste at ambient temperature;

(d) stearic acid which is solid at ambient temperature;

(e) polyethylene glycol which is solid at ambient temperature;

(f) wax which is solid at ambient temperature; and (g) 1) kaolin which is solid at ambient temperature;
  2) calcium carbonate which is solid at ambient temperature; or
  3) talc powder at ambient temperature.

The crayon composition of the present invention does not use water as a solvent, but uses the mode of direct heating for solution thereof. The content of pigment is generally 2.2% by weight. If too much pigment is used, the viscosity of the crayon composition will be excessively high, and therefore the drawing character will be poor, and also the scrubbing capability will be lowered. On the other hand, if the content of pigment is too low, the track of the drawing character will be too light, thus making it impractical.

The polyoxyethylene nonyl phenyl ether used as a dispersing agent of pigment and as a stabilizer of stearic acid is in the form of a paste and is of milky color while at ambient temperature. The polyoxyethylene nonyl phenyl ether comprises about 3% by weight of the composition. One object of using polyoxyethylene nonyl phenyl ether is as an auxiliary emulsifier, such that the water solubility of the composition is improved and no track will be left after scrubbing. There will also be no environment contamination as a result.

The sorbitan monostearate as a surfactant in the crayon composition of the present invention is in the form of a paste at ambient temperature. It is a botanical stearic acid, which comprises about 1% by weight of the composition and acts as an auxiliary emulsifier. The function thereof is to more evenly disperse other materials, and to improve the scrubbing capability.

The stearic acid in the crayon composition of the present invention may be animal or botanical, but the botanical ones are preferred.

The crayon composition of the present invention has 25.5% by weight of polyethylene glycol with a molecular weight of 4,000. The temperature for heat solution of the polyethylene glycol of molecular weight 4,000 is 95° C., while it is 120° C. for polyethylene glycol of molecular weight 10,000. Therefore, the larger the molecular weight, the higher the temperature required for heat solution, and the denser the consistency, so that the solution is difficult to stir. Hence coloration therefor is poorer, which may result an uneven coloration. The workability of polyethylene glycol is the best when its molecular weight is 4,000, and this can reduce the degree of contamination.

Wax in the crayon composition of the present invention is 4% by weight of the composition. The wax may for example be paraffin or oxidized olefin wax.

Kaolin in the crayon composition of the present invention is 25.5% by weight of the composition. The kaolin be substituted by an equivalent amount by weight of calcium carbonate or powdered talc, but coverage of kaolin is exceedingly better than calcium carbonate, and kaolin is better than powdered talc in coloration. Hence it is preferred to use kaolin. However, any one of kaolin, calcium carbonate or powdered talc can be the filler or basic material of the present invention individually.

the followings are the examples of the present invention, but the present invention is not in any sense limited by these embodiments. Wherein each % indicates the % by weight.

EXAMPLES

| Crayon composition 1 | |
| --- | --- |
| Pigment | 2.2% |
| Stearic acid | 38.8% |
| Kaolin, calcium carbonate or powdered talc, | 25.5% |
| polyethylene glycol | 25.5% |
| polyoxyethylene nonyl phenyl ether | 3% |
| Wax | 4% |
| Sorbitan monostearate | 1% |
| Crayon composition 2 (control) | |
| Wax | 56.6% |
| Polyvinyl wax | 8% |
| polyoxyethylene nonyl phenyl ether | 16% |
| Clay | 16% |
| Pigment | 3.4% |

The above two crayon compositions were painted on a non-absorptive plane made of enamel. The dried tracs thereon were scrubbed slightly with a dry cloth 5 minutes later. The scrubbing capability of the track at that time (preliminary scrubbing capability) and the scrubbing capability thereof after staying for 15 days under the temperature of 25° C. and the relative humidity of 60% (regular scrubbing capability) were recorded. The result is shown in Table 1 below, wherein the mark "0" means "excellent", "0" means "good", while " " means "fair", and "X" means "bad", and are decided by vision.

| | priliminary scrubbing capability | regular scrubbing capability |
| --- | --- | --- |
| Crayon composition 1 | 0 | 0 |
| Crayon composition 2 | ^ | X |

The invention is to be construed as including all modifications and variations falling within the scope of the appended claims.

I claim:

1. A washable crayon composition which comprises:
   (a) about 2% by weight pigment;
   (b) about 3% by weight dispersing agent or stabilizer;
   (c) about 1% by weight surfactant;
   (d) about 38% by weight stearic acid;
   (e) about 25% by weight polyethylene glycol;
   (f) about 4% by weight of wax; and
   (g) about 25% by weight of filler.

2. A composition according to claim 1 wherein the polyethylene glycol has a molecular weight of at least about 4,000 and less than 10,000.

3. A composition according to claim 2 wherein the polyethylene glycol has a molecular weight of about 4,000.

4. A composition according to claim 2 wherein the dispersing agent or stabilizer is polyoxyethylene nonyl phenyl ether.

5. A composition according to claim 2 wherein the surfactant is sorbitan monostearate.

6. A composition according to claim 2 wherein the filler is kaolin, calcium carbonate or talc powder.

7. A composition according to claim 6 wherein the filler is kaolin.

8. A washable crayon composition which comprises;
   (a) about 2% by weight pigment;
   (b) about 3% by weight polyoxyethylene nonyl phenyl ether;
   (c) about 1% by weight sorbitan monostearate;
   (d) about 38% by weight stearic acid;
   (e) about 25% by weight polyethylene glycol having a molecular weight of at least about 4,000 and less than 10,000;
   (f) about 4% by weight of wax; and
   (g) about 25% by weight of filler, which is kaolin, calcium carbonate or talc powder.

9. A composition according to claim 1 wherein the stearic acid is botanical stearic acid.

10. A composition according to claim 8 wherein the stearic acid is botanical stearic acid.

11. A process for the preparation of a washable crayon composition which comprises mixing solid pigment, polyoxyethylene nonyl phenyl ether paste, sorbitan monostearate paste, solid stearic acid, solid polyethylene glycol, solid wax and a solid filler at ambient temperature; heating the mixture at about 95° C. to solubilize the mixture; and stirring the solubilized mixture to even coloration.

12. A process according to claim 11 wherein the composition comprises:
   (a) about 2% by weight pigment;
   (b) about 3% by weight polyoxyethylene nonyl phenyl ether;
   (c) about 1% by weight sorbitan monostearate;
   (d) about 38% by weight stearic acid;
   (e) about 25% by weight polyethylene glycol;

(f) about 4% by weight of wax; and (g) about 25.5% by weight of filler.

13. A process according to claim 12 wherein the polyethylene glycol has a molecular weight of at least about 4000 and less than 10,000.

14. A process according to claim 13 wherein the polyethylene glycol has a molecular weight of about 4000.

15. A process according to claim 13 wherein the filler is kaolin, calcium carbonate or talc powder.

16. A process according to claim 11 wherein the stearic acid is botainical stearic acid.

17. A process according to claim 13 wherein the stearic acid is botainical stearic acid.

* * * * *